(12) United States Patent
Gu et al.

(10) Patent No.: US 12,240,948 B2
(45) Date of Patent: Mar. 4, 2025

(54) REMOLDABLE SHAPE MEMORY BISMALEIMIDE RESIN AND USE THEREOF

(71) Applicant: SOOCHOW UNIVERSITY, Suzhou (CN)

(72) Inventors: Aijuan Gu, Suzhou (CN); Guozheng Liang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 598 days.

(21) Appl. No.: 17/631,382

(22) PCT Filed: Jul. 27, 2020

(86) PCT No.: PCT/CN2020/104990
§ 371 (c)(1),
(2) Date: Jan. 28, 2022

(87) PCT Pub. No.: WO2021/018100
PCT Pub. Date: Feb. 4, 2021

(65) Prior Publication Data
US 2022/0325046 A1    Oct. 13, 2022

(30) Foreign Application Priority Data
Jul. 30, 2019   (CN) .................. 201910696950.5

(51) Int. Cl.
*C08G 73/12*   (2006.01)
*C08G 73/10*   (2006.01)

(52) U.S. Cl.
CPC ....... *C08G 73/124* (2013.01); *C08G 73/1078* (2013.01); *C08G 2280/00* (2013.01)

(58) Field of Classification Search
CPC .............. C08G 73/124; C08G 73/1078; C08G 2280/00
See application file for complete search history.

(56) References Cited

U.S. PATENT DOCUMENTS 3,014,890 A * 12/1961 Harline ................ C07D 303/22
526/345

FOREIGN PATENT DOCUMENTS

CN    106589819 A    4/2017
CN    108219370 A    6/2018
(Continued)

OTHER PUBLICATIONS

Liu et al. (Macromolecules 2017, 50, 8588-8597).*

*Primary Examiner* — Shane Fang
(74) *Attorney, Agent, or Firm* — SZDC Law PC

(57) ABSTRACT

A method of preparing a remoldable shape memory bismaleimide resin includes blending 2-allylphenyl glycidyl ether and adipic acid in acetonitrile, carrying out an esterification reaction under the condition of quaternary ammonium salt as a catalyst to obtain bis(3-(2-allylphenoxy)-2-hydroxypropyl)adipate containing a reversible dynamic group; then uniformly mixing bis(3-(2-allylphenoxy)-2-hydroxypropyl) adipate and bismaleimide, curing to obtain the remoldable shape memory bismaleimide resin. The prepared remoldable shape memory bismaleimide resin is not only excellent heat resistance and mechanical properties, but also can be remolded under hot pressing conditions. The method of preparing the remoldable shape memory bismaleimide resin has the advantages of wide raw material sources and simple process, and has a wide application prospect in the fields of aerospace, transportation, electronic information, new energy, insulated electrical industry and the like.

10 Claims, 13 Drawing Sheets

(56) References Cited

FOREIGN PATENT DOCUMENTS

| | | | |
|---|---|---|---|
| CN | 108484910 | A | 9/2018 |
| CN | 108586743 | A | 9/2018 |
| CN | 110330647 | A | 10/2019 |
| EP | 1920006 | A2 | 5/2008 |

* cited by examiner

Example 1

REMOLDABLE SHAPE MEMORY BISMALEIMIDE RESIN AND USE THEREOF

This application is the National Stage Application of PCT/CN2020/104990, filed on Jul. 27, 2020, which claims priority to Chinese Patent Application No. 201910696950.5, filed on Jul. 30, 2019, which is incorporated by reference for all purposes as if fully set forth herein.

TECHNICAL FIELD

The present invention relates to a remoldable shape memory bismaleimide resin and its preparation method, and relates to the technical field of thermosetting shape memory polymers and recyclable polymers.

TECHNICAL BACKGROUND

Shape memory polymers (SMPs) are a class of smart materials that deform autonomously by responding to external stimuli (heat, light, electricity, magnetism, and solvents). They are lightweight, high-strength, easy to process, diverse in response methods, and simple in shape control advantage. Generally speaking, SMPs are divided into two types: thermoset SMPs and thermoplastic SMPs. Thermoset SMPs have better mechanical properties, higher thermal transition temperature and better thermal stability than thermoplastic SMPs. They have self-expanding structure and shape deformation in space. Structures, intelligent jet propulsion systems, high-temperature sensors and actuators have broad application prospects. It is foreseeable that with the development of technology, the demand for lightweight and high-strength thermosetting SMPs in fields such as space self-expanding structures will increase to meet the development trend of lightweight and high-strength. However, traditional thermosetting SMPs cannot be reprocessed or reshaped by heating or using solvents. Waste thermosetting SMPs often cause waste of resources and environmental pollution. The emergence of remodelable thermosetting resins has brought solutions to the above problems.

In recent years, researchers have combined remodelable thermoset resins with shape memory materials to develop remodelable thermoset SMPs, which solved the shortcomings of non-remodelable thermoset SMPs. However, the remodelable thermosetting SMPs reported in the existing literature are limited by the performance of the remodelable thermosetting resin matrix, and often cannot combine high heat resistance, high mechanical properties and good shape memory properties. The common problems are: (1) Poor heat resistance (initial thermal decomposition temperature<350° C., glass transition temperature<130° C.); (2) Poor mechanical properties (tensile strength<50 MPa, tensile modulus<2000 MPa). This limits the application of remodelable thermoset SMPs in high-performance fields.

In summary, the development of a remodelable shape memory polymer with good shape memory performance, high temperature resistance and high mechanical strength is a subject of great application value.

THE INVENTION CONTENT

The purpose of the present invention is to provide a remoldable shape memory bismaleimide resin with good shape memory performance, high heat resistance, high tensile performance and good shape memory performance as well as its preparation and application method aiming at the shortcomings of existing technologies.

The present invention adopts the following technical scheme.

A remoldable shape memory bismaleimide resin, and the preparation method of remoldable shape memory bismaleimide resin include the following steps.
(1) In the presence of a quaternary ammonium salt, bis(3-(2-allylphenoxy)-2-hydroxypropyl)adipate is synthesized by reacting 2-allylphenyl glycidyl ether and adipic acid;
(2) Remoldable shape memory bismaleimide resin system is synthesized by reacting bis(3-(2-allylphenoxy)-2-hydroxypropyl)adipate, bismaleimide, and a zinc compound;
(3) The remoldable shape memory bismaleimide resin is prepared using cured and post-treated remoldable shape memory bismaleimide resin system.

The present invention also discloses a preparation method for remoldable shape memory bismaleimide resin includes the following steps.
(1) In the presence of a quaternary ammonium salt, bis(3-(2-allylphenoxy)-2-hydroxypropyl)adipate is synthesized by reacting 2-allylphenyl glycidyl ether and adipic acid;
(2) Remoldable shape memory bismaleimide resin system is synthesized by bis(3-(2-allylphenoxy)-2-hydroxypropyl)adipate, bismaleimide, and a zinc compound;
(3) The remoldable shape memory bismaleimide resin is prepared using cured and post-treated remodelable bismaleimide resin system;
(4) The remoldable shape memory bismaleimide resin is prepared with remoldable shape memory bismaleimide resin is pulverized and hot-pressing treated to realize the remodeling of the bismaleimide resin.

The present invention also discloses a remodeled bismaleimide resin, and the preparation method of remodeled bismaleimide resin comprising the following steps: the remoldable shape memory bismaleimide resin is prepared using a hot pressing treatment to heat the pulverized remoldable shape memory bismaleimide resin.

In the present invention, the 2-allylphenyl glycidyl ether is synthesized by reacting epichlorohydrin with a mixture of 2-allylphenol, sodium hydroxide, a quaternary ammonium salt and tetrahydrofuran.

In the above technical scheme, in the step (1), a mass ratio of 2-allylphenyl glycidyl ether, adipic acid and quaternary ammonium salt is 120:36-44:5-10, the reaction temperature is 65-80° C., and a reaction time is 8-12 h; in the step (2), a mass ratio of bismaleimide, bis(3-(2-allylphenoxy)-2-hydroxypropyl)adipate and the zinc compound is 50:63.13-109.88:6.76-11.76, a stirring temperature is 120-135° C., and a reaction time is 15-25 min; in the step (3), the remoldable shape memory bismaleimide resin system is cured and post-treated by casting.

In the above technical scheme, the quaternary ammonium salt is tetramethylammonium bromide or tetrabutylammonium bromide; the zinc compound is zinc acetylacetonate hydrate; the bismaleimide is one or more selected from the group consisting of N,N'-4,4'-diphenylmethane bismaleimide, N,N'-(1,4-phenylene) bismaleimide and N,N'-m-phenylene bismaleimide.

The present invention also discloses the remoldable shape memory bismaleimide resin that is used in the preparation of remodelable materials or remodelable thermosetting resins.

In the above technical scheme, in the step (4), a temperature of hot pressing treatment is 240-300° C., a pressure is 20-50 MPa and a reaction time is for 2-10 h.

The present invention discloses a preparation method of the remoldable shape memory bismaleimide resin, including the following steps.

The solution A was obtained by 120 parts of 2-allylphenol, 100-150 parts of NaOH, 5-10 parts of quaternary ammonium salt and 200-300 parts of tetrahydrofuran are maintained and stirred at 25-40° C. for 1-2 h; 2-allylphenyl glycidyl ether is obtained by 250-350 parts of epichlorohydrin is slowly added into the solution A, which is maintained the temperature for 6-10 h.

Bis(3-(2-allylphenoxy)-2-hydroxypropyl)adipate is obtained by 120 parts of 2-allylphenyl glycidyl ether, 36-44 parts of adipic acid, 5-10 parts of quaternary ammonium salt and 200-300 parts of acetonitrile are maintained and stirred at 65-80° C. for 8-12 h.

Clear prepolymer (remoldable shape memory bismaleimide resin system) is obtained by 50 parts of bismaleimide, 63.13-109.88 parts of bis(3-(2-allylphenoxy)-2-hydroxypropyl)adipate and 6.76-11.76 parts of zinc acetylacetonate are stirred at 120-135° C. for 15-25 min. Then curing and post-treatment to obtain a remoldable shape memory bismaleimide resin.

The amount of the above raw materials is based on the mass. The curing and post-treatment can be specifically as follows, pouring the clarified prepolymer into a mold, putting it in a vacuum oven at 130° C. and vacuum for 45 minutes; move the vacuumed prepolymer into a blast drying box, and curing and post-curing according to the following process: 160° C./2 h+180° C./2 h+200° C./2 h+220° C./2 h and 240° C./4 h; demold after natural cooling, and get remoldable shape memory bismaleimide resin.

BENEFICIAL EFFECT

Compared with existing technologies, the beneficial effects of the present invention are as follows,
1. The invention synthesizes a novel bisallyl compound containing a reversible dynamic group, uses it to modify the bismaleimide, and prepares a novel remoldable shape memory bismaleimide resin containing a reversible covalent bond.
2. Compared with traditional thermosetting SMPs, the remodelable shape memory bismaleimide tree prepared by the present invention has both good shape memory performance and remodeling performance.
3. Compared with the remodelable shape memory thermosetting resins reported in the existing literature, the remoldable shape memory bismaleimide resin prepared by the present invention has outstanding heat resistance, which is characterized by an initial thermal decomposition temperature ($T_{di}$) of 367° C., glass transformation temperature ($T_g$) reaches 143° C. The good heat resistance of the reshaped shape memory bismaleimide resin benefits from the reasonable formula of the resin system, the preparation process and the large number of benzene rings and the six-membered ring formed by curing in the resin.
4. Compared with the remodelable shape memory thermosetting resins reported in the existing literature, the remoldable shape memory bismaleimide resin prepared by the present invention has outstanding tensile properties, with a tensile strength of 88 MPa and a tensile modulus of 2918 MPa. The good tensile properties of the reshaped shape memory bismaleimide resin benefit from the large number of benzene rings in the resin and the six-membered ring formed by curing.
5. The remodelable shape memory bismaleimide resin provided by the present invention has good shape memory performance, and the shape fixation rate and the shape recovery rate are 94% and 98.6%, respectively. This is because the synthesized new bisallyl compound bis (3-(2-allylphenoxy)-2-hydroxypropyl) adipate has good rotation flexibility; in addition, the crosslink density of the cured resin is moderate, which is conducive to obtaining good shape memory performance.
6. Compared with the traditional 2,2'-diallylbisphenol A, the new diallyl compound bis (3-(2-allylphenoxy)-2-hydroxypropyl)adipate provided by the present invention does not require high-temperature rearrangement, the synthesis process is simple, and the required energy consumption is small.
7. Compared with the traditional 2,2'-diallylbisphenol A, the new diallyl compound bis (3-(2-allylphenoxy)-2-hydroxypropyl)adipate provided by the present invention is Non-bisphenol A type, therefore, there is no risk of carcinogenesis, teratogenicity, and fertility effects of BPA.

EXAMPLES

The technical scheme of the present invention is further elaborated in combination with attached Figures and Examples.

A remoldable shape memory bismaleimide resin, and the preparation method of the remoldable shape memory bismaleimide resin includes the following steps.
(1) In the presence of quaternary ammonium salt, bis(3-(2-allylphenoxy)-2-hydroxypropyl)adipate is synthesized by reacting 2-allylphenyl glycidyl ether and adipic acid;
(2) Remoldable shape memory bismaleimide resin system is synthesized by reacting bis(3-(2-allylphenoxy)-2-hydroxypropyl)adipate, bismaleimide, and a zinc compound;
(3) The remoldable shape memory bismaleimide resin is prepared using cured and post-treated remoldable shape memory bismaleimide resin system.

Example 1

Figure 1:
FIG. 1 shows a synthesis reaction formula of 2-allylphenyl glycidyl ether and bis(3-(2-allylphenoxy)-2-hydroxypropyl)adipate prepared in the present invention.
Figure 2:
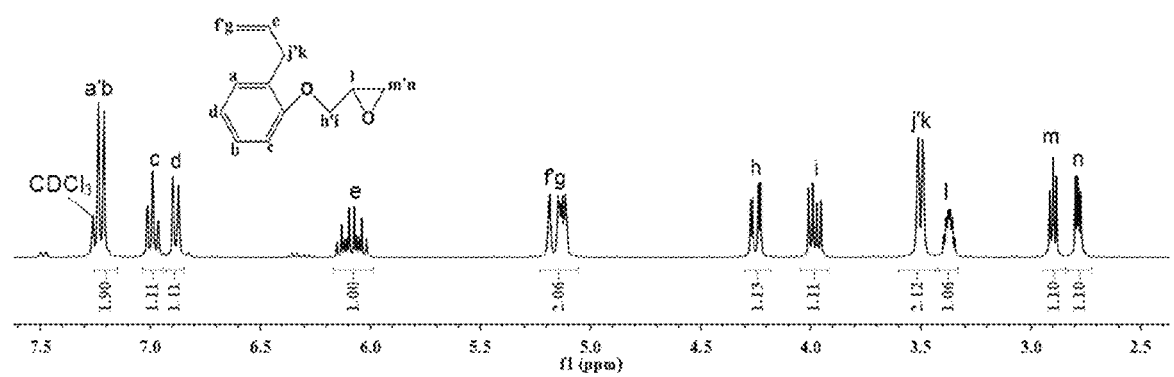
FIG. 2 shows $^1$HNMR spectra of 2-allylphenyl glycidyl ether prepared in Example 1.

1) The preparation of 2-allylphenyl glycidyl ether: by mass, a solution A was obtained by 120 g of 2-allylphenol, 140 g of NaOH, 10 g of tetrabutylammonium bromide and 230 g of tetrahydrofuran were mixed and stirred at 35° C. for 1.5 h; and then, 270 g of epichlorohydrin was slowly added into the solution A, which was maintained at 35° C. for 6 h. After the reaction, tetrahydrofuran and epichlorohydrin were removed in vacuum rotary evaporation propane to obtain a crude product. The crude product was washed with saturated NH$_4$Cl solution (200 ml×2) and deionized water (200 mL×2) successively, and finally separated and purified using column chromatography to obtain a yellow viscous liquid, which is 2-allylphenyl glycidyl ether (yield was 93%). The reaction formula and $^1$H-NMR are shown in FIGS. 1 and 2, respectively.

Figure 3:
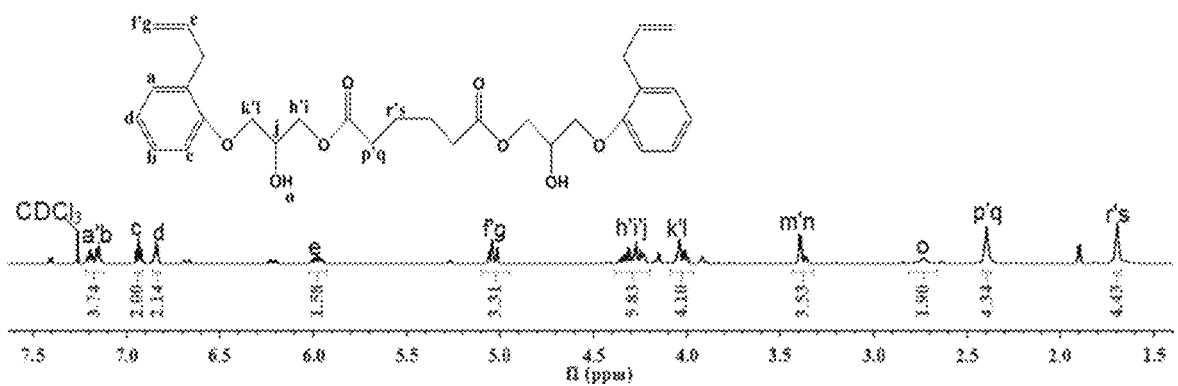
FIG. 3 shows $^1$HNMR spectra of bis(3-(2-allylphenoxy)-2-hydroxypropyl)adipate prepared in Example 1.
Figure 4:
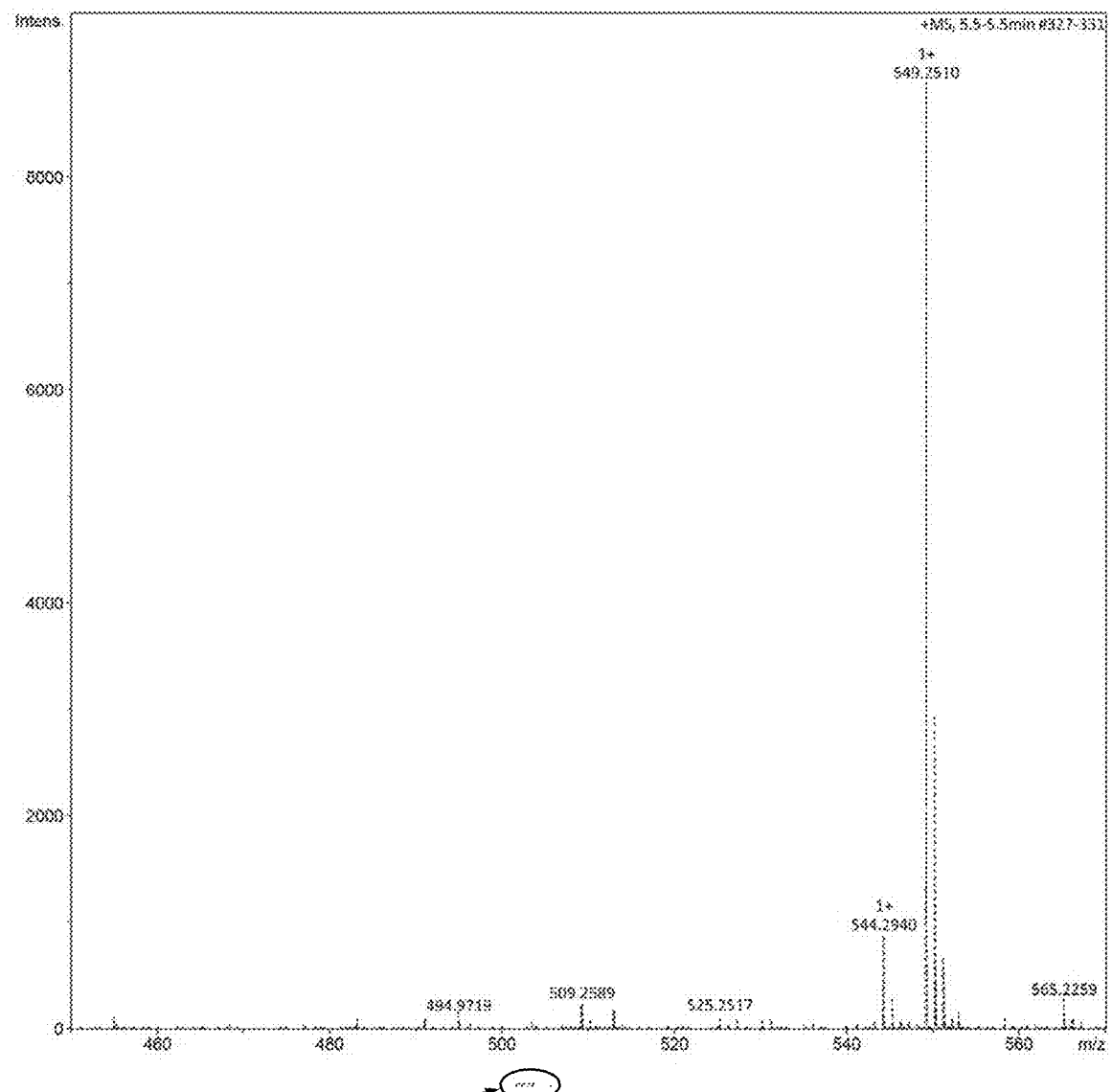
FIG. 4 shows high resolution mass spectrum of bis(3-(2-allylphenoxy)-2-hydroxypropyl)adipate prepared in Example 1.

2) The preparation of bis(3-(2-allylphenoxy)-2-hydroxypropyl)adipate: by mass, 120 g of 2-allylphenyl glycidyl ether, 40 g of adipic acid, 10 g of tetrabutylammonium bromide and 230 g of acetonitrile were maintained and were stirred at 70° C. for 8 h. After the reaction, acetonitrile was removed in vacuum rotary evaporation propane to give a crude product. The crude product was washed with saturated NaHCO$_3$ solution (200 ml×2) and deionized water (200 mL×2), successively, finally separated and purified using column chromatography to obtain a yellow oil product, which is bis(3-(2-allylphenoxy)-2-hydroxypropyl)adipate (yield was 87.2%). The reaction formula, $^1$HNMR, $^{13}$CNMR and high resolution mass spectrum are shown in FIGS. 1, 3, 4.

3) The preparation of remoldable shape memory bismaleimide resin, N,N'-4,4'-diphenylmethane bismaleimide 50 g (139.5 mmol), bis(3-(2-allylphenoxy)-2-hydroxypropyl)adipate 73.41 g (139.5 mmol) and zinc acetylacetonate hydrate 7.86 g (27.9 mmol) and stirred and prepolymerized at 120° C. for 20 min to obtain a clear prepolymer. Pouring the clarified prepolymer into the preheated mold at 130° C., putting it in a vacuum oven at 130° C. for 45 minutes; moving the evacuated prepolymer into a blast drying oven, and solidify according to the following process post-treatment: 160° C./2 h+180° C./2 h+200° C./2 h+220° C./2 h and 240° C./4 h; after natural cooling, demolding. The remoldable shape memory bismaleimide resin was obtained. The DSC curves of the clarified prepolymer of the remoldable shape memory bismaleimide resin, the TGA curves, the Tan δ-temperature curves, tensile stress-strain curves, the consecutive dual-shape memory cycles, triple-shape memory, stress relaxation curves of the remoldable shape memory bismaleimide resin are shown in FIGS. 5, 6, 7, 8, 9, 10, and 11, respectively.

Figure 12:
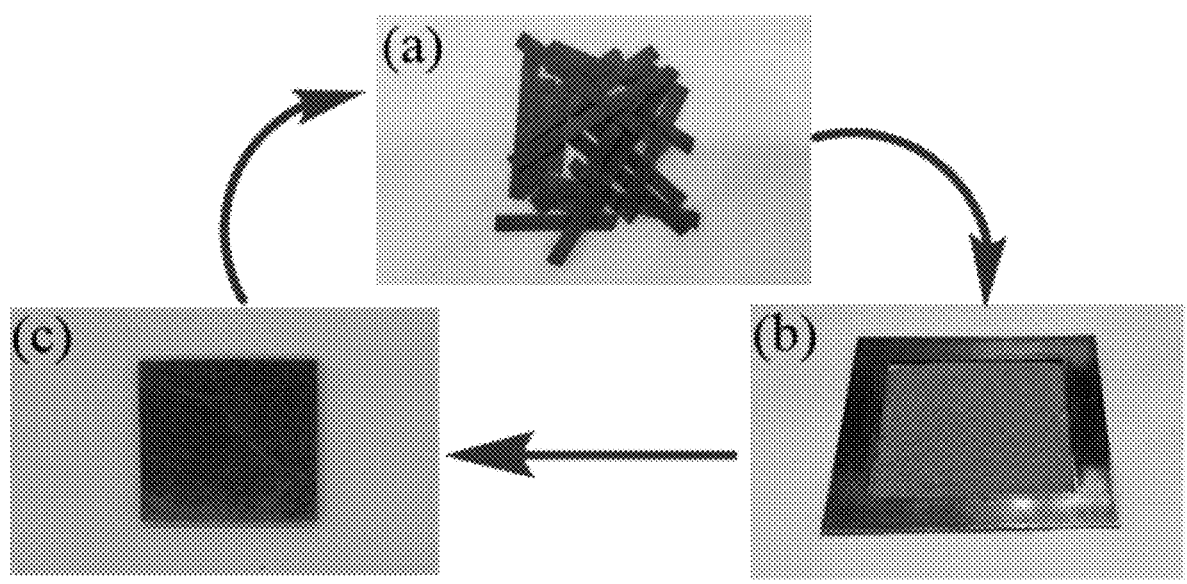
FIG. 12 shows digital photographs during the remolding process of the remoldable shape memory bismaleimide resins prepared in Example 1, a, b, c, d represent the state of each stage.
Figure 13:
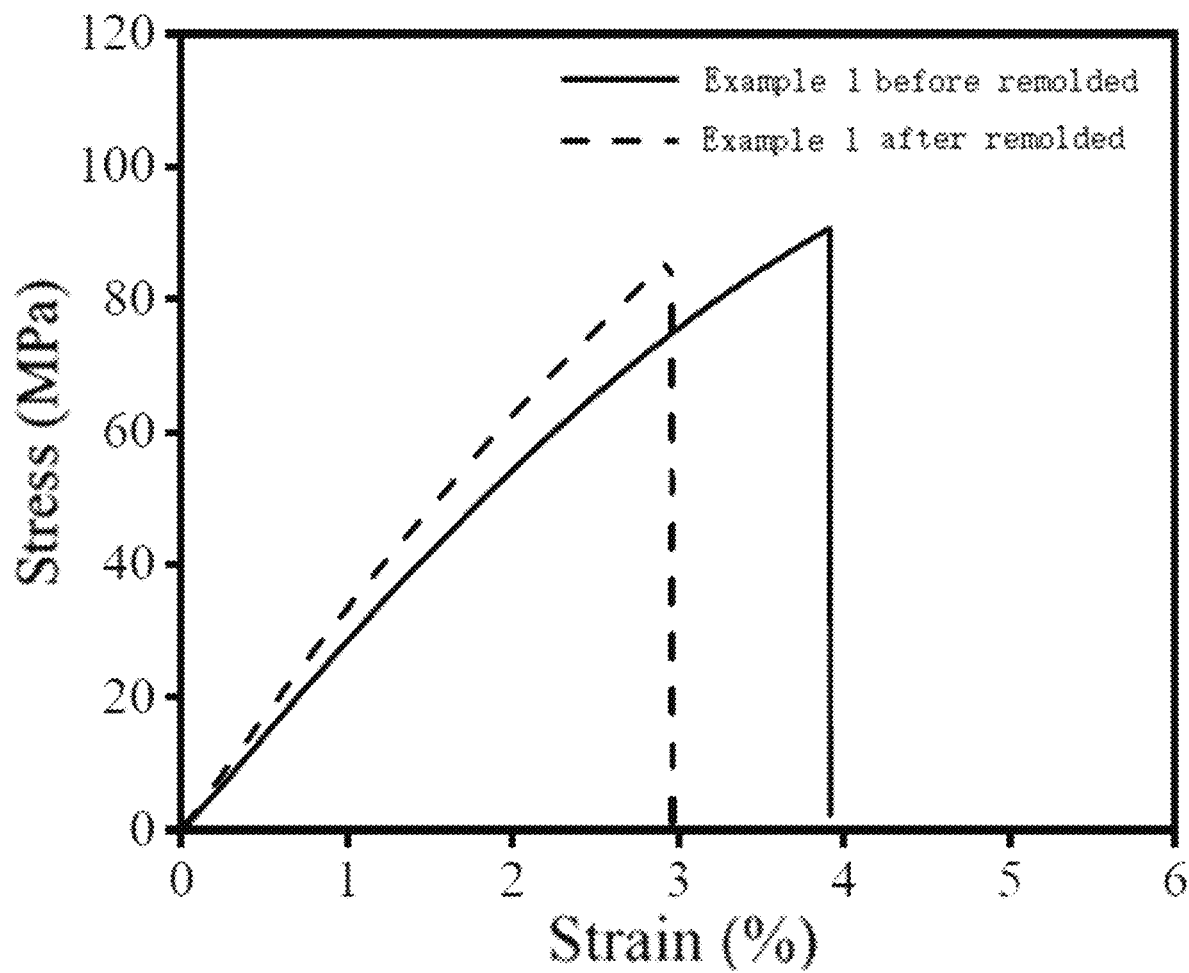
FIG. 13 shows tensile stress-strain curves of the remoldable shape memory bismaleimide resin prepared in Example 1 before and after remolding
Figure 14:
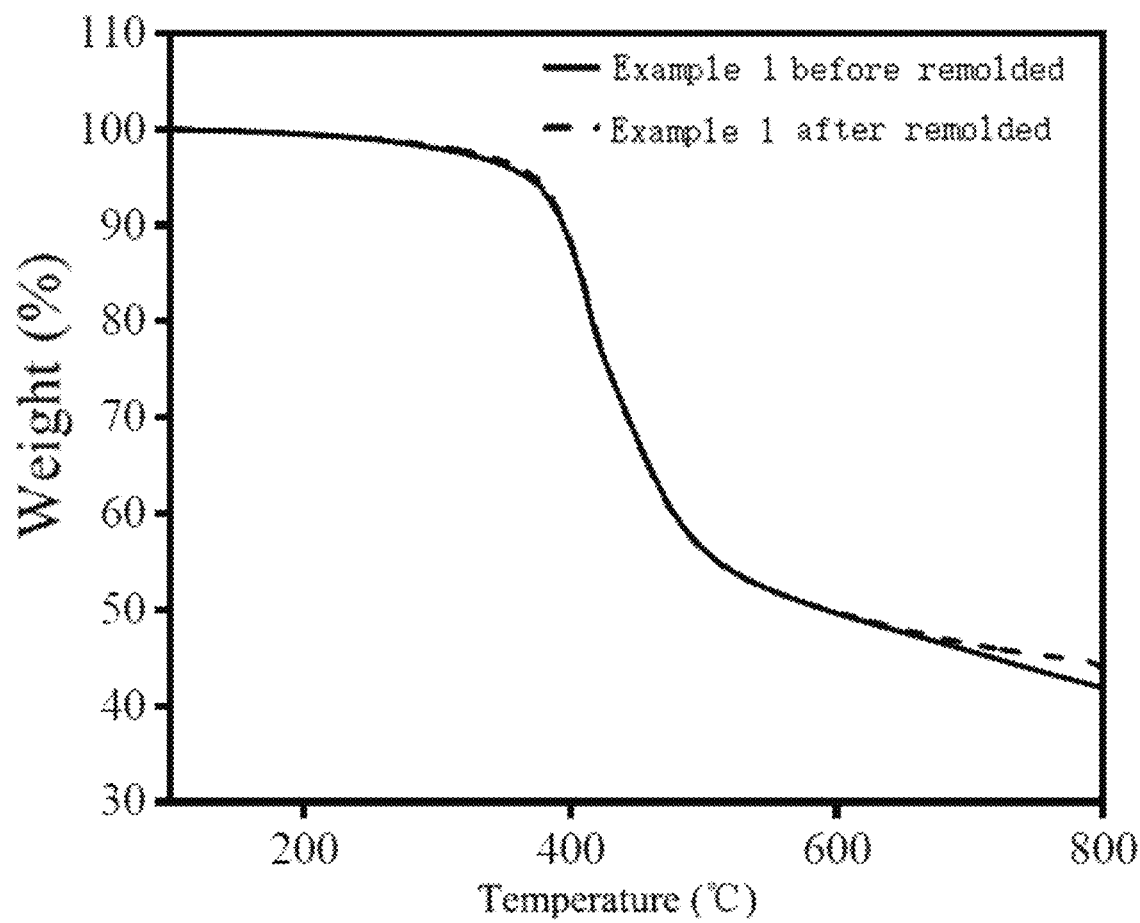
FIG. 14 shows TGA curves of the remoldable shape memory bismaleimide resin prepared in Example 1 before and after remodeling.

4) Remodeling method of remoldable shape memory bismaleimide resin and remodeled bismaleimide resin, pressing down the pulverized remoldable shape memory bismaleimide resin at 270° C. and 40 MPa for 7 h; after natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention. The digital photographs during the remolding process, the tensile stress-strain curves and the TGA curves of the remoldable shape memory bismaleimide resins are shown in FIGS. 12, 13, and 14 respectively.

Refer to FIG. 2, it shows $^1$HNMR spectra of 2-allylphenyl glycidyl ether prepared in Example 1. In this figure, there are proton resonances on allyl and benzene rings, and characteristic peaks of epoxy group protons appear near 2.80 ppm, 2.90 ppm and 3.36 ppm, indicating that 2-allylphenol has reacted with epichlorohydrinn. 2-allylphenyl glycidyl ether was produced.

Refer to FIG. 3, it shows $^1$HNMR spectra of bis(3-(2-allylphenoxy)-2-hydroxypropyl)adipate prepared in Example 1. In this figure, there are proton resonances on the allyl and benzene rings. Although the characteristic peak of the proton of the epoxy group has disappeared, the characteristic peak of the proton of —OH appears near 2.74 ppm, indicating that the epoxy group has reacted with the carboxyl group, generated 3-hydroxy ester.

Refer to FIG. 4, it shows high resolution mass spectrum of bis(3-(2-allylphenoxy)-2-hydroxypropyl)adipate prepared in Example 1. The theoretical molecular weight [M] of bis(3-(2-allylphenoxy)-2-hydroxypropyl)adipate is 526.2567, and the theoretical value [M+Na$^+$] is 549.2459, is in agreement with experimental value is 549.2510.

Based on the above figures, it can be seen that Example 1 successfully synthesized bis(3-(2-allylphenoxy)-2-hydroxypropyl)adipate.

Control Example 1

Figure 8:
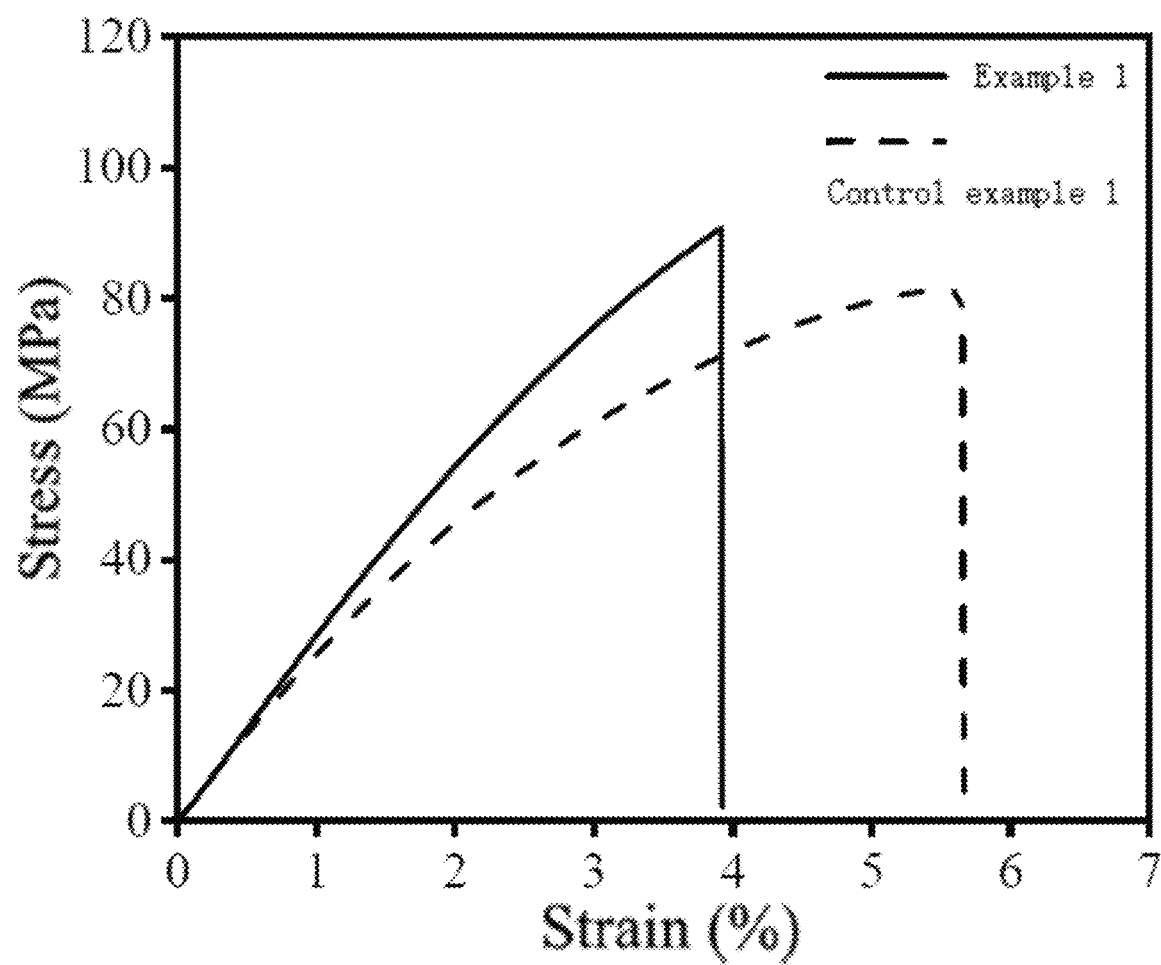
FIG. 8 shows tensile stress-strain curves of the remoldable shape memory bismaleimide resin prepared in Example 1 and the diallyl bisphenol A modified bismaleimide resin of Control Example 1.

1) Preparation of diallyl bisphenol A modified bismaleimide resin, N,N'-4,4'-diphenylmethane bismaleimide 50 g (139.5 mmol), 2,2'-diallyl bisphenol A 43.03 g (139.5 mmol) and zinc acetylacetonate hydrate 7.86 g (27.9 mmol) and stirred and prepolymerized at 120° C. for 20 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the diallyl bisphenol A modified bismaleimide resin can be obtained. The DSC curves of the clarified prepolymer of the diallyl bisphenol A modified bismaleimide resin, the tensile stress-strain curves of the diallyl bisphenol A modified bismaleimide resin are shown in FIGS. 5 and 8 respectively.

2) Remoldability of the diallyl bisphenol A modified bismaleimide resin, pressing down the pulverized the diallyl bisphenol A modified bismaleimide resin at 270° C. and 40 MPa for 7 h; the obvious granular plate was obtained after natural cooling and released the mold. The surface of the board has obvious graininess, is easy to break, and has almost no mechanical strength, which proves that the diallyl bisphenol A modified bismaleimide resin cannot be reshaped. The digital photographs during the remolding process of the diallyl bisphenol A modified bismaleimide resin prepared in Control Example 1 refer to FIG. 15.

Figure 5:
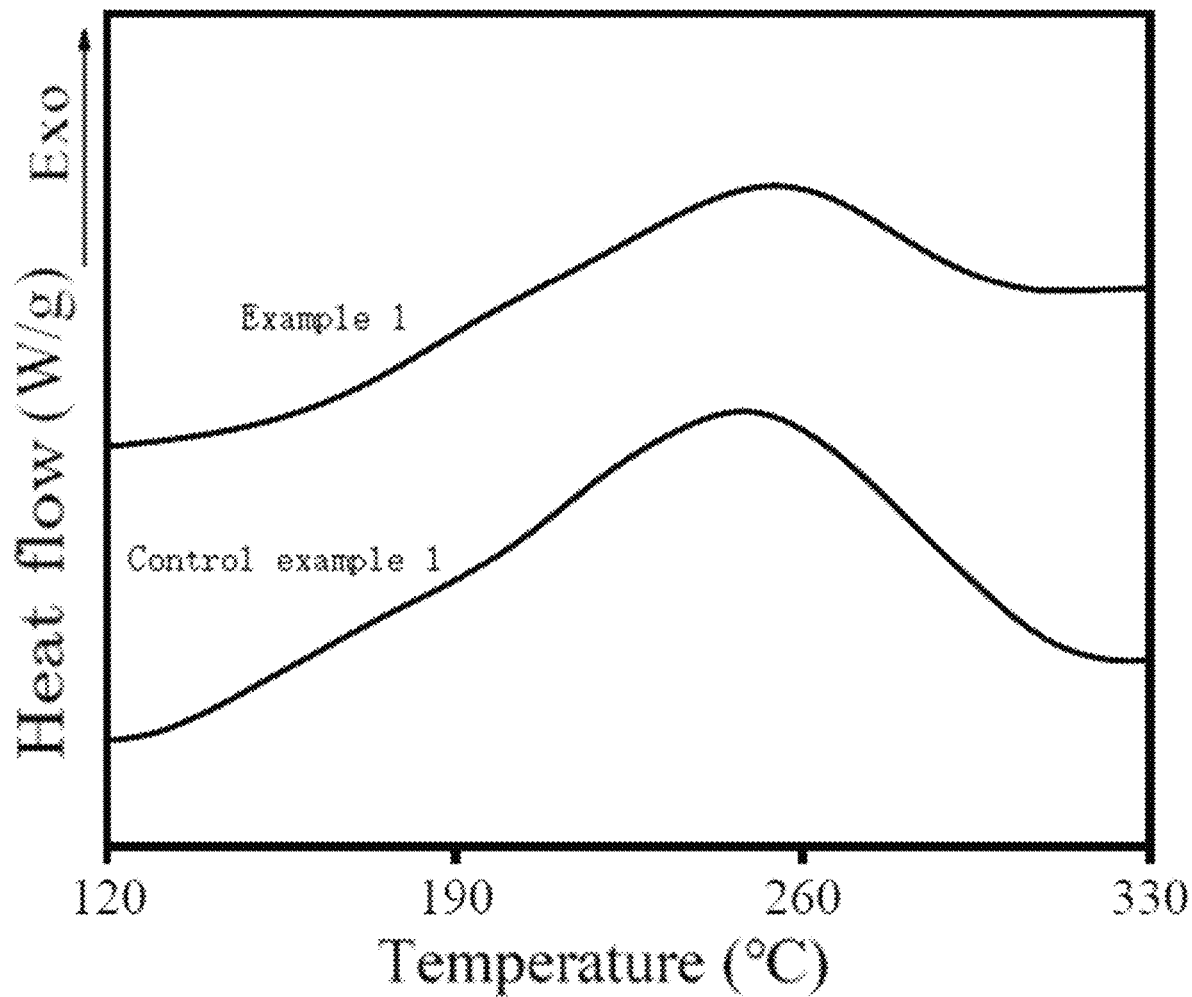
FIG. 5 shows the DSC curves of the prepolymer of the remoldable shape memory bismaleimide resin prepared in Example 1 and the diallyl bisphenol A modified bismaleimide resin of Control Example 1 under nitrogen atmosphere, the heating rate is 10° C./min.

Refer to FIG. 5, it shows the DSC curves of the prepolymer of the remoldable shape memory bismaleimide resin prepared in Example 1 and the diallyl bisphenol A modified bismaleimide resin of Control Example 1 under nitrogen atmosphere, the heating rate is 10° C./min. It can be seen that the maximum reaction exothermic peak of the remoldable shape memory bismaleimide resin of Example 1 is at 248.6° C., which is lower than that at 254.5° C. of the diallyl bisphenol A modified bismaleimide resin in Control Example 1, it indicates that the reactivity of the remoldable shape memory bismaleimide resin of Example 1 is greater than that of the diallyl bisphenol A modified bismaleimide resin in Control Example 1.

Figure 6:
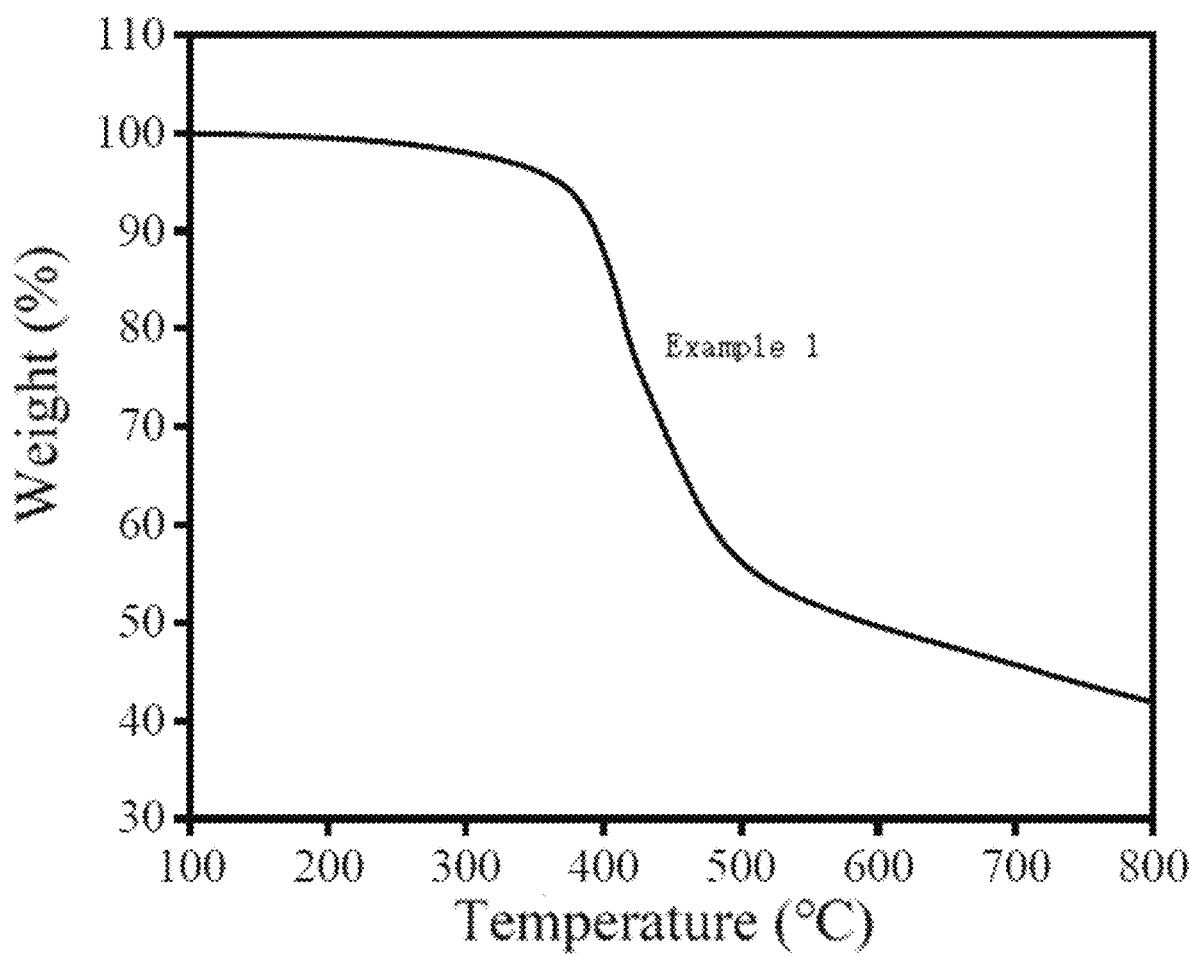
FIG. 6 shows TGA curves of the remoldable shape memory bismaleimide resin prepared in Example 1 under a nitrogen atmosphere, and the heating rate is 10° C./min.

Refer to FIG. 6, it shows TGA curves of the remoldable shape memory bismaleimide resin prepared in Example 1 under a nitrogen atmosphere. In general, the thermal stability of a material is characterized by the initial thermal decomposition temperature. the $T_{di}$ is higher the better, so the remoldable shape memory bismaleimide resin has good heat resistance, and its $T_{di}$ is 367° C. The existing literature reports that the $T_{di}$ of the remodelable thermosetting resin is generally lower than 350° C. (see Table 1).

Refer to attached table 1, which is the $T_{di}$, $T_g$, tensile strength and tensile modulus of the remoldable shape memory bismaleimide resin prepared in Example 1 of the present invention and the high-performance remodelable thermosetting resin reported in the existing literature and other performance parameters. The documents listed in Appendix 1 are representative of remodelable thermoset SMPs with good heat resistance or tensile properties in the search results. It can be seen that, compared with the remodelable thermosetting SMPs reported in the existing literature, the remodelable shape memory bismaleimide resin prepared in Example 1 of the present invention has outstanding heat resistance and tensile properties.

TABLE 1

Heat resistance and tensile properties of existing high-performance remoldable thermoset SMPs

| remoldable thermoset SMPs resin | $T_{di}$ (° C.) | $T_g$ (° C.) | tensile strength (MPa) | tensile modulus (MPa) | reference |
|---|---|---|---|---|---|
| Example 1 | 367 | 143 | 88 | 2918 | this patent |
| Epoxy/bismaleimide ester exchange system | 366 | 125 | / | / | [1] |
| Epoxy silyl ether system | 314 | 129 | 82.4 | 1864 | [2] |
| Epoxy ester exchange system | 274 | 133 | 12.9 | 354.5 | [3] |
| Epoxy ester exchange system | 310 | 53 | −25 | / | [4] |
| Epoxy ester exchange system | 345 | 42.9 | 12 | 565.9 | [5] |
| Epoxy ester exchange system | 341 | 50 | −22 | | [6] |
| Epoxy disulfide bond system | / | 60 | 54 | / | [7] |
| Cross-linked Polyethylene | / | 105 | −21 | / | [8] |

REFERENCES

[1] Ding, Z.; Yuan, L.; Guan, Q.; Gu, A.; Liang, G., A reconfiguring and self-healing thermoset epoxy/chain-extended bismaleimide resin system with thermally dynamic covalent bonds. *Polymer* 2018, 147, 170-182.

[2] Ding, Z.; Yuan, L.; Liang, G.; Gu, A., Thermally resistant thermadapt shape memory crosslinked polymers based on silyl ether dynamic covalent linkages for self-folding and self-deployable smart 3D structures. *Journal of Materials Chemistry A* 2019.

[3] Zhang, S.; Liu, T.; Hao, C.; Wang, L.; Han, J.; Liu, H.; Zhang, J., Preparation of a lignin-based vitrimer material and its potential use for recoverable adhesives. *Green Chemistry* 2018, 20 (13), 2995-3000.

[4] Liu, T.; Hao, C.; Wang, L.; Li, Y.; Liu, W.; Xin, J.; Zhang, J., Eugenol-Derived Biobased Epoxy: Shape Memory, Repairing, and Recyclability. *Macromolecules* 2017, 50 (21), 8588-8597.

[5] Yang, Z.; Wang, Q.; Wang, T., Dual-Triggered and Thermally Reconfigurable Shape Memory Graphene-Vitrimer Composites. *ACS Appl Mater Interfaces* 2016, 8 (33), 21691-9.

[6] Yang, Y.; Pei, Z.; Li, Z.; Wei, Y.; Ji, Y., Making and Remaking Dynamic 3D Structures by Shining Light on Flat Liquid Crystalline Vitrimer Films without a Mold. *J Am Chem Soc* 2016, 138 (7), 2118-21.

[7] McBride, M. K.; Podgorski, M.; Chatani, S.; Worrell, B. T.; Bowman, C. N., Thermoreversible Folding as a Route to the Unique Shape-Memory Character in Ductile Polymer Networks. *ACS Appl Mater Interfaces* 2018, 10 (26), 22739-22745.

[8] Ji, F.; Liu, X.; Lin, C.; Zhou, Y.; Dong, L.; Xu, S.; Sheng, D.; Yang, Y., Reprocessable and Recyclable Crosslinked Polyethylene with Triple Shape Memory Effect. *Macromolecular Materials and Engineering* 2018, 304 (3), 1800528.

Figure 7:
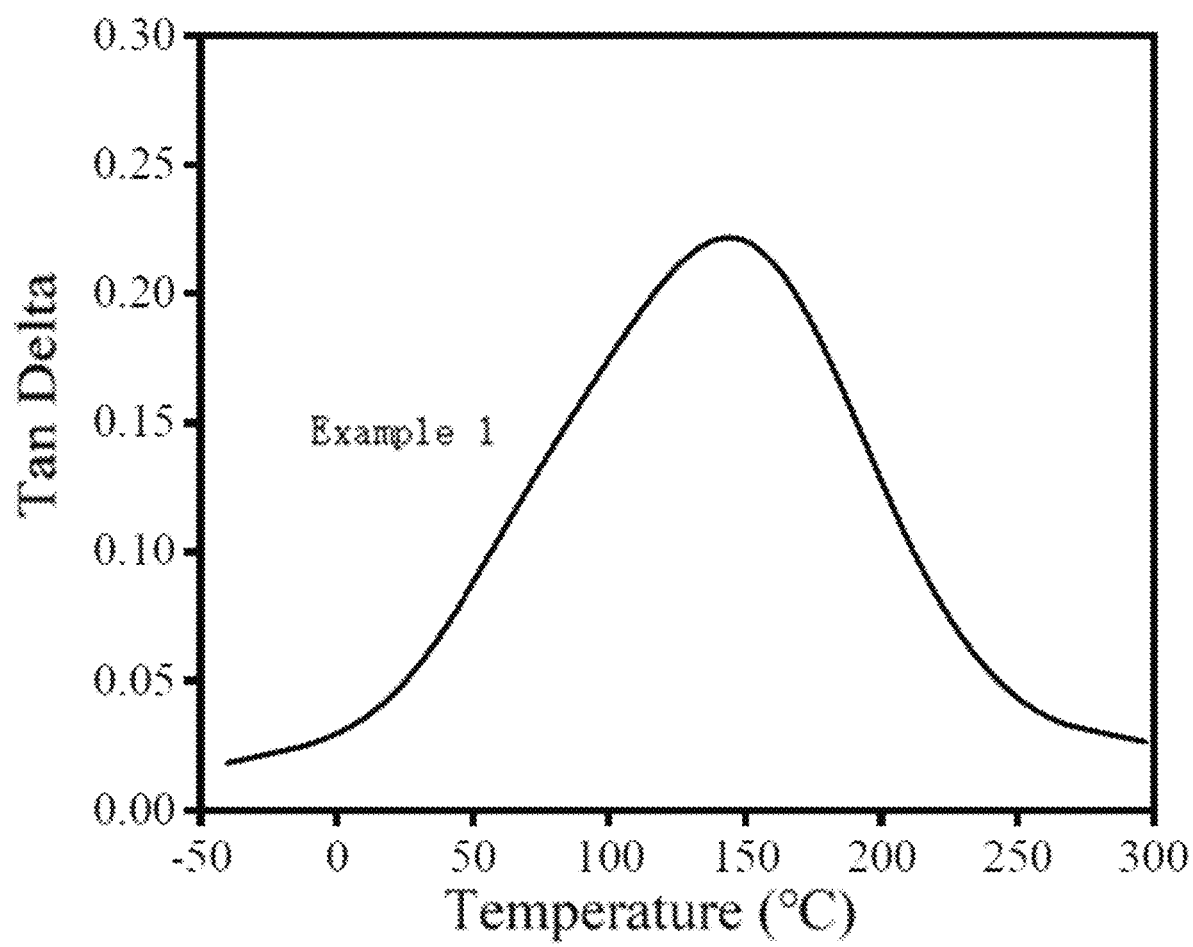
FIG. 7 shows Tan δ-temperature curves of the remoldable shape memory bismaleimide resin prepared in Example 1, the heating rate is 3° C./min, and the frequency is 1 Hz.

Refer to FIG. 7, shows Tan δ-temperature curves of the remoldable shape memory bismaleimide resin prepared in Example 1. The curve presents a single symmetrical Tan δ peak, and the peak temperature of Tan δ serves as the glass transition temperature ($T_g$). Generally speaking, $T_g$ represents the upper limit temperature of thermosetting materials. The $T_g$ is higher the better, so the $T_g$ of the remoldable shape memory bismaleimide resin is 143° C., showing good heat resistance. The existing literature currently reports that the $T_g$ of the remoldable thermosetting SMPs is generally lower than 130° C. (see Table 1).

Refer to FIG. 8, it shows tensile stress-strain curves of the remoldable shape memory bismaleimide resin prepared in Example 1 and the diallyl bisphenol A modified bismaleimide resin of Control Example 1. It can be seen that the tensile strength of the remoldable shape memory bismaleimide resin prepared in Example 1 is 88 MPa, the tensile modulus is 2918 MPa, and the elongation at break is 3.92% (the existing literature reports that the remoldable thermosetting resin the tensile modulus is generally lower than 2700 MPa, see attached table 1); the diallyl bisphenol A modified bismaleimide resin prepared in Control Example 1 has a tensile strength of 81 MPa and a tensile modulus of 2595 MPa, The elongation at break is 5.62%. Compared with the remoldable thermoset SMPs reported in the existing literature, the remoldable shape memory bismaleimide resin prepared in Example 1 has outstanding tensile properties (see attached table 1).

Figure 9:
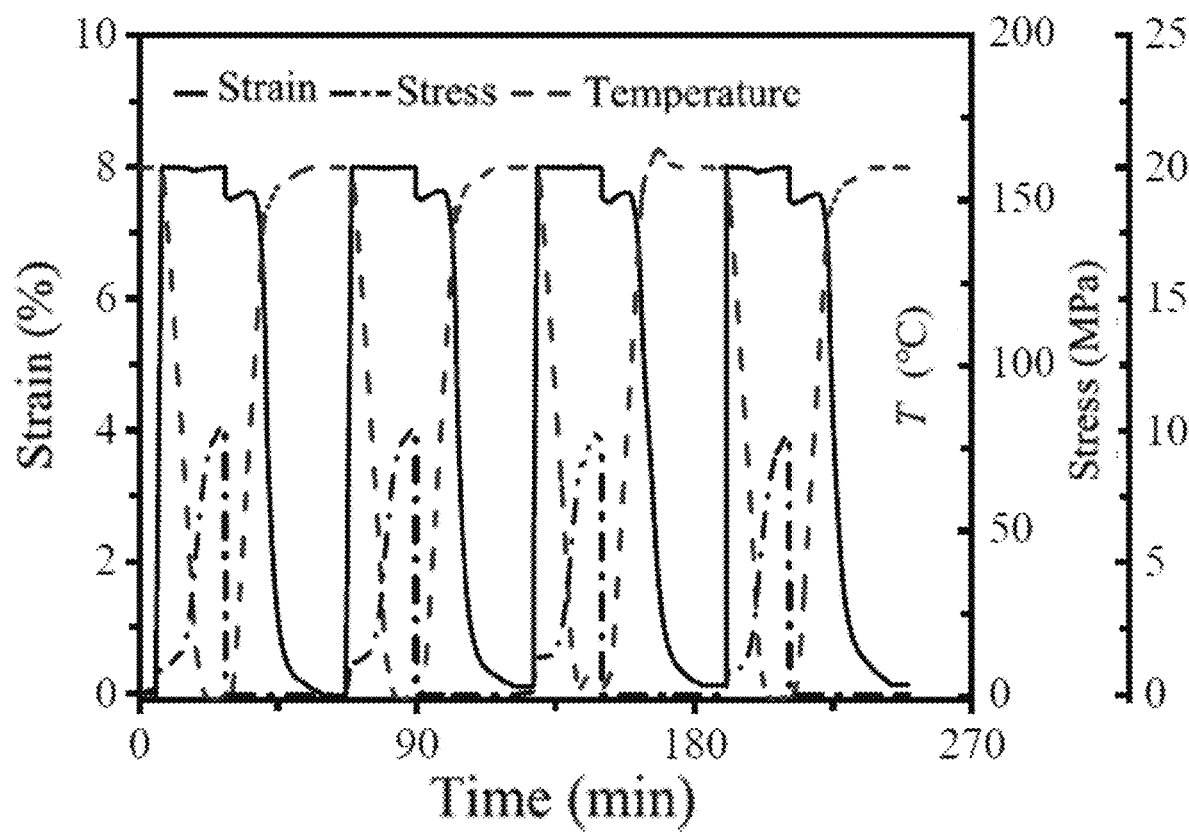
FIG. 9 shows consecutive dual-shape memory cycles of the remoldable shape memory bismaleimide resin prepared in Example 1.

Refer to FIG. 9, shows consecutive dual-shape memory cycles of the remoldable shape memory bismaleimide resin prepared in Example 1. Generally speaking, shape fixation rate and shape recovery rate are important parameters to characterize the shape memory performance of materials. It can be seen that the shape fixation rate of the remoldable shape memory bismaleimide resin prepared in Example 1 ($R_f$) is 94%, and the shape recovery rate (Rr) is 98.6%. Both parameters have reached the mainstream level in the literature report. At the same time, in the present invention, the remoldable shape memory bismaleimide resin prepared in Example 1 also has higher heat resistance and tensile properties than the remoldable thermoset shape memory material reported in the prior literature, indicating that the remoldable shape memory bismaleimide resin prepared in Example 1 of the present invention The plastic bismaleimide resin combines good heat resistance, tensile properties and shape memory properties. In addition, after four cycles of testing, there is almost no change in the shape fixation rate and shape recovery rate of the resin, indicating that the remoldable shape memory bismaleimide resin prepared in Example 1 of the present invention has good shape memory cycle stability and performance shape fixation and shape recovery occurred multiple times.

Figure 10:
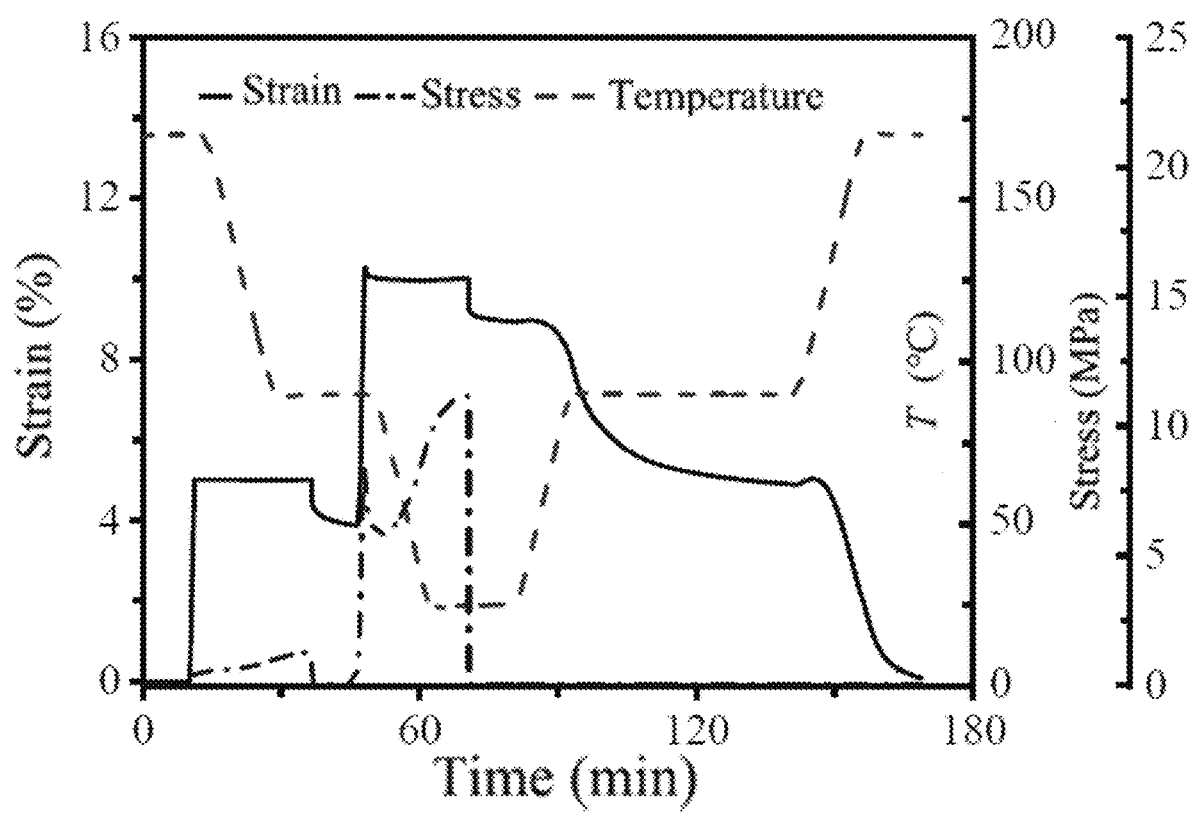
FIG. 10 shows triple-shape memory cycles of the remoldable shape memory bismaleimide resin prepared in Example 1.

Refer to FIG. 10, shows the triple shape memory curve of the remodelable shape memory bismaleimide resin prepared in Example 1 of the present invention. It can be seen from this that the two shape fixation rates ($R_{f1}$ and $R_{f2}$) of the reshaped shape memory bismaleimide resin prepared in Example 1 of the present invention in the triple shape memory test are 77% and 83%, respectively. The recovery rates ($R_{r1}$ and $R_{r2}$) were 83% and 99.8%, respectively, indicating that the remodelable shape memory bismaleimide resin prepared in Example 1 of the present invention not only has good double shape memory performance, but also has good triple shape memory performance, which benefits from the wide thermal transition temperature range of the resin. However, most of the remodelable thermoset SMPs reported in the existing literature can only achieve dual shape memory, indicating that the remodelable shape memory bismaleimide resin prepared in Example 1 of the present invention has more shape programming capabilities and can be applied the field is broader.

Figure 11:
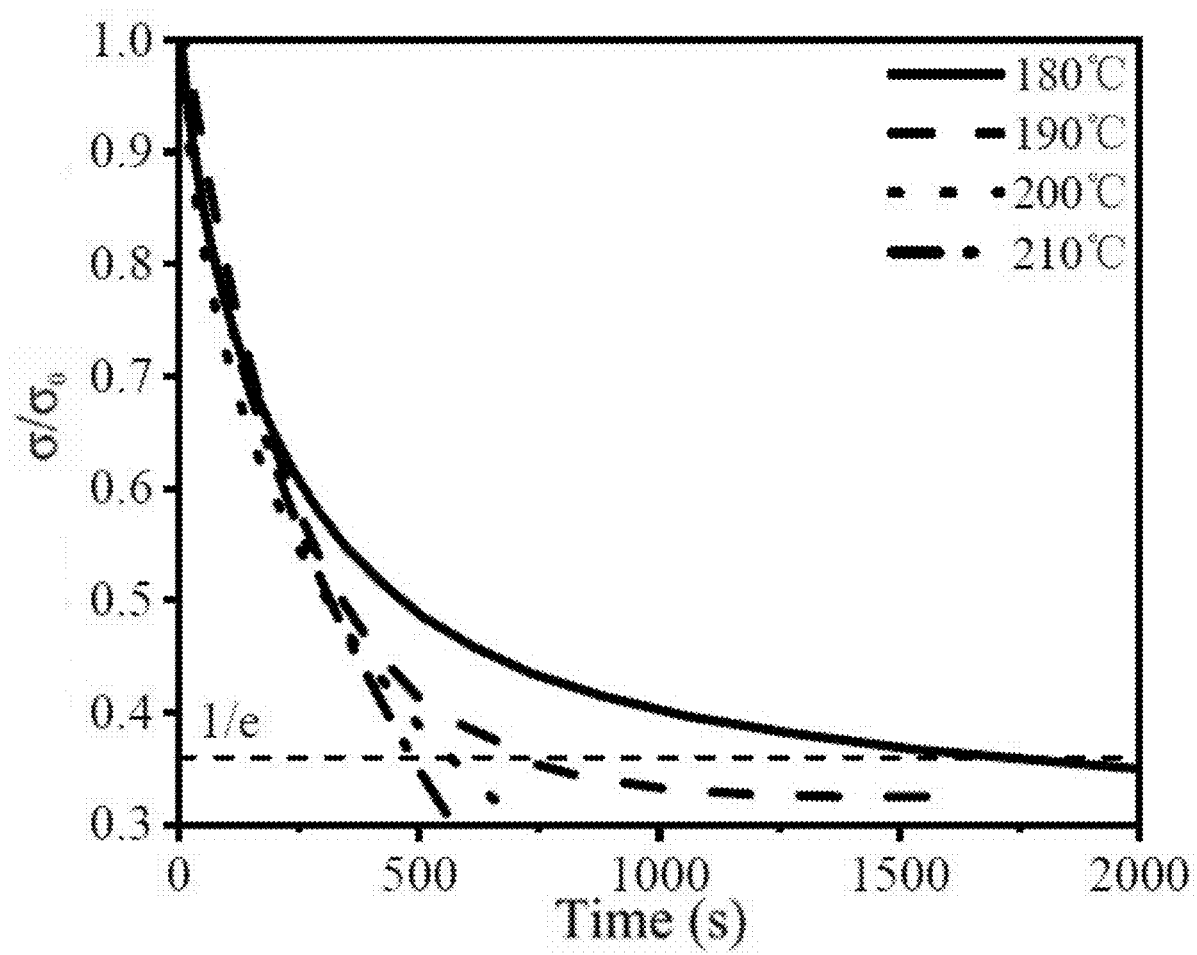
FIG. 11 shows stress relaxation curves of the remoldable shape memory bismaleimide resin prepared in Example 1 at different temperatures.

Refer to FIG. 11, shows stress relaxation curves of the remoldable shape memory bismaleimide resin prepared in Example 1 at different temperatures. It can be seen that as the temperature increases, the decay rate of the internal stress of the polymer becomes faster and faster. It can be seen from the trend that when the temperature reaches a certain value, the internal stress of the resin will attenuate to zero, which is similar to the stress relaxation curve of the thermoplastic resin, which proves that the reshape under heating remoldable bismaleimide resin can be like a thermoplastic resin.

Refer to FIG. 12, it shows digital photographs during the remolding process of the remoldable shape memory bismaleimide resin prepared in Example 1, and the arrows indicate the process steps. The resin is pulverized into particles with a pulverizer; the resin particles are placed in a mold and molded at 270° C. and 40 MPa for 7 hours; the mold is released after natural cooling to obtain a remodelable bismaleimide board. The surface of the remolded resin is smooth, without cracks, and without graininess, indicating that the resin particles have been reconnected through the exchange of dynamic bonds, which proves that the bismaleimide resin prepared by the present invention can be remolded.

Refer to FIG. 13, it shows tensile stress-strain curves of the remoldable shape memory bismaleimide resin prepared in Example 1 before and after remodeling. From this, we can intuitively compare the tensile properties of the resin before and after remolding. After remolding, the tensile strength of the resin is 82 MPa, the tensile modulus is 3094 MPa, and the repair efficiency of the two parameters are 93% and 106%, respectively. Indicating that the bismaleimide resin after remolding still maintains good tensile properties, and the tensile modulus after remolding is higher than that before remolding. The reason is that the high temperature molding process causes a small amount of incompletely reacted groups in the resin. Further, the reaction is complete, the crosslinking density of the resin becomes larger and the modulus increases.

Refer to FIG. 14, it shows TGA curves of the remoldable shape memory bismaleimide resin prepared in Example 1 before and after remodeling. It can be seen that the TGA curves of the resin before and after remolding almost overlap, and the $T_{di}$ of the resin after remolding is at 371° C. It can be seen that the bonding strength of the chemical bond of the remodeled resin is the same as that before the remodeling, so that the remodeled resin still has outstanding thermal stability.

In summary, the remoldable shape memory bismaleimide resin prepared by the present invention has outstanding heat resistance, high mechanical properties, good shape memory performance and good remodeling performance.

Figure 15:
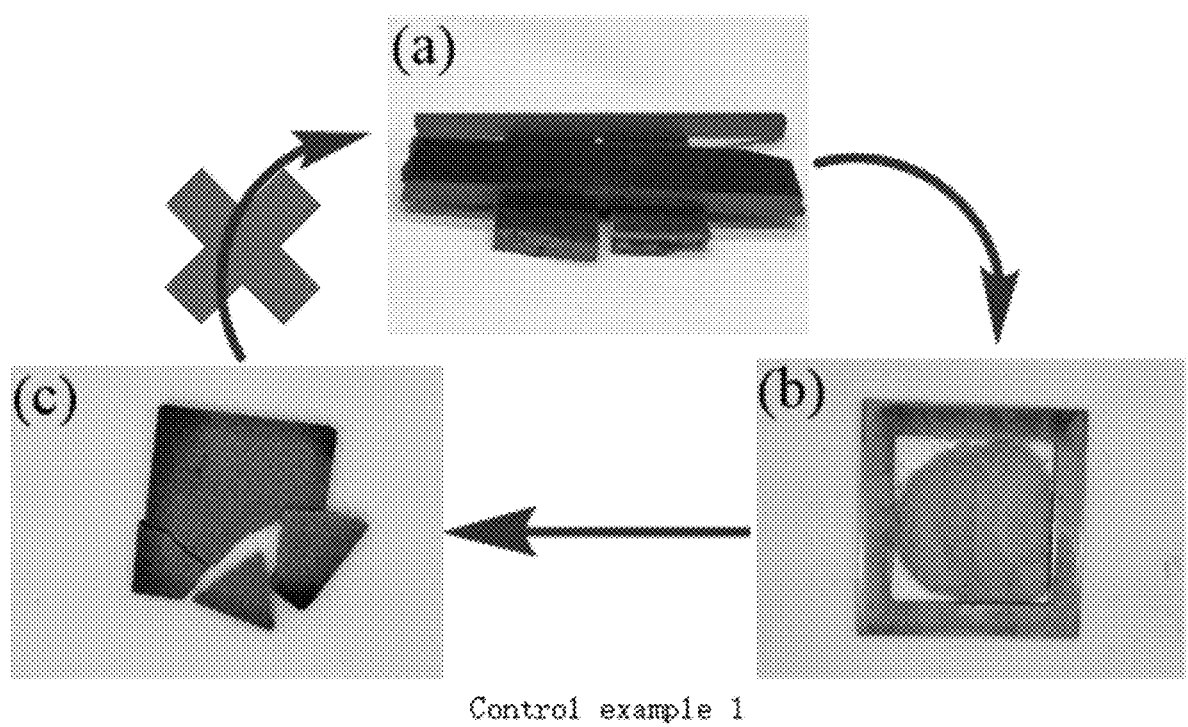
FIG. 15 shows digital photographs during the remolding process of the diallyl bisphenol A modified bismaleimide resin prepared in Control Example 1, a, b, c, d represent the state of each stage.

Refer to FIG. 15, it shows digital photographs during the remolding process of the diallyl bisphenol A modified bismaleimide resin prepared in Control Example 1, and the arrows indicate the process steps. The resin is pulverized into particles with a pulverizer; the resin particles are placed in a mold, and the resin particles are molded at 270° C. and 40 MPa for 7 hours; the mold is released after natural cooling to obtain a granular plate. The surface of the board has obvious graininess and is easy to break. It has almost no mechanical strength, indicating that the resin particles are only close to each other under the action of external pressure, and they are not reconnected to each other. The above results prove that the diallyl bisphenol A modified bismaleimide resin prepared in Control Example 1 have no replasticity and cannot be reshaped by hot pressing.

Example 2

1) The preparation of 2-allylphenyl glycidyl ether.

By mass, the solution A was obtained by 120 g of 2-allylphenol, 100 g of NaOH, 5 g of tetramethylammonium bromide and 200 g of tetrahydrofuran were maintained and stirred at 25° C. for 1 h; and then, 250 g of epichlorohydrin was slowly added into the solution A, which was maintained at 25° C. for 6 h. After the reaction, tetrahydrofuran and epichlorohydrin were removed in vacuum rotary evaporation propane to give the crude product. The crude product was washed with saturated NH₄Cl solution (200 ml×2) and deionized water (200 mL×2) successively. Finally separated and purified using column chromatography to obtain a yellow viscous liquid which is 2-allylphenyl glycidyl ether (yield was 90.1%).

2) The preparation of bis(3-(2-allylphenoxy)-2-hydroxypropyl)adipate.

By mass, 120 g of 2-allylphenyl glycidyl ether, 36 g of adipic acid, 5 g of tetramethylammonium bromide and 200 g of acetonitrile were maintained and stirred at 65° C. for 8 h. After the reaction, acetonitrile was removed in vacuum rotary evaporation propane to give the crude product. The crude product was washed with saturated NaHCO₃ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 86.7%).

3) The preparation of remoldable shape memory bismaleimide resin, N,N'-4,4'-diphenylmethane bismaleimide 50 g (139.5 mmol), bis(3-(2-allylphenoxy)-2-hydroxypropyl)adipate 63.13 g (119.97 mmol) and zinc acetylacetonate hydrate 6.67 g (23.99 mmol) and stirred and prepolymerized at 125° C. for 25 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained. The $T_{di}$ is 365° C.

4) Remodeling method of remoldable shape memory bismaleimide resin and remodeled bismaleimide resin, pressing down the pulverized remoldable shape memory bismaleimide resin at 240° C. and 50 MPa for 10 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention. After remolding, the repair efficiency of the two parameters of the tensile strength and tensile modulus is 93% and 103%, indicating that the reshaped bismaleimide resin still maintains good tensile properties.

Example 3

1) The preparation of 2-allylphenyl glycidyl ether.

By mass, the solution A was obtained by 120 g of 2-allylphenol, 140 g of NaOH, 7.5 g of tetrabutylammonium bromide and 250 g of tetrahydrofuran are maintained and stirred at 35° C. for 1.5 h; and then, 300 g of epichlorohydrin was slowly added into the solution A, which was maintained at 35° C. for 8 h. After the reaction, tetrahydrofuran and epichlorohydrin were removed in vacuum rotary evaporation propane to give the crude product. The crude product was washed with saturated NH₄Cl solution (200 ml×2) and deionized water (200 mL×2) successively. Finally separated and purified using column chromatography to obtain a yellow viscous liquid which is 2-allylphenyl glycidyl ether (yield was 91.7%).

2) The preparation of bis(3-(2-allylphenoxy)-2-hydroxypropyl)adipate.

By mass, 120 g of 2-allylphenyl glycidyl ether, 42 g of adipic acid, 7.5 g of tetrabutylammonium bromide and 250 g of acetonitrile were maintained and stirred at 75° C. for 10 h. After the reaction, acetonitrile was removed in vacuum rotary evaporation propane to give the crude product. The crude product was washed with saturated NaHCO₃ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 88.1%).

3) The preparation of remoldable shape memory bismaleimide resin, N,N'-4,4'-diphenylmethane bismaleimide 50 g (139.5 mmol), bis(3-(2-allylphenoxy)-2-hydroxypropyl)adipate 82.22 g (156.24 mmol) and zinc acetylacetonate hydrate 8.23 g (31.35 mmol) and stirred and prepolymerized at 130° C. for 15 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained. The $T_{di}$ is 363° C.

4) Remodeling method of remoldable shape memory bismaleimide resin and remodeled bismaleimide resin, pressing down the pulverized remoldable shape memory bismaleimide resin at 240° C. and 40 MPa for 8 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention. After remolding, the repair efficiency of the two parameters of the tensile strength and tensile modulus is 91% and 101%, indicating that the reshaped bismaleimide resin still maintains good tensile properties.

Example 4

1) The preparation of 2-allylphenyl glycidyl ether.

By mass, the solution A was obtained by 120 g of 2-allylphenol, 150 g of NaOH, 10 g of tetrabutylammonium bromide and 300 g of tetrahydrofuran are maintained and stirred at 40° C. for 2 h; and then, 350 g of epichlorohydrin was slowly added into the solution A, which was maintained at 40° C. for 10 h. After the reaction, tetrahydrofuran and epichlorohydrin were removed in vacuum rotary evaporation propane to give the crude product. The crude product was washed with saturated NH₄Cl solution (200 ml×2) and deionized water (200 mL×2) successively. Finally separated and purified using column chromatography to obtain a yellow viscous liquid which is 2-allylphenyl glycidyl ether (yield was 93.7%).

2) The preparation of bis(3-(2-allylphenoxy)-2-hydroxypropyl)adipate.

By mass, 120 g of 2-allylphenyl glycidyl ether, 44 g of adipic acid, 10 g of tetrabutylammonium bromide and 300 g of acetonitrile were maintained and stirred at 80° C. for 12 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 86.4%).

3) The preparation of remoldable shape memory bismaleimide resin, N,N'-(1,4-phenylene) bismaleimide 50 g (186.4 mmol), bis(3-(2-allylphenoxy)-2-hydroxypropyl)adipate 84.36 g (160.3 mmol) and zinc acetylacetonate hydrate 9.03 g (32.06 mmol) and stirred and prepolymerized at 130° C. for 18 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 300° C. and 20 MPa for 2 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 5

1) The preparation of 2-allylphenyl glycidyl ether.

By mass, the solution A was obtained by 120 g of 2-allylphenol, 130 g of NaOH, 10 g of tetrabutylammonium bromide and 280 g of tetrahydrofuran are maintained and stirred at 30° C. for 2 h; and then, 320 g of epichlorohydrin was slowly added into the solution A, which was maintained at 30° C. for 10 h. After the reaction, tetrahydrofuran and epichlorohydrin were removed in vacuum rotary evaporation propane to give the crude product. The crude product was washed with saturated $NH_4Cl$ solution (200 ml×2) and deionized water (200 mL×2) successively. Finally separated and purified using column chromatography to obtain a yellow viscous liquid which is 2-allylphenyl glycidyl ether (yield was 92.6%).

2) The preparation of bis(3-(2-allylphenoxy)-2-hydroxypropyl)adipate.

By mass, 120 g of 2-allylphenyl glycidyl ether, 41 g of adipic acid, 10 g of tetrabutylammonium bromide and 300 g of acetonitrile were maintained and stirred at 70° C. for 10 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 87.9%).

3) The preparation of remoldable shape memory bismaleimide resin, N,N'-(1,4-phenylene) bismaleimide 50 g (186.4 mmol), bis(3-(2-allylphenoxy)-2-hydroxypropyl)adipate 98.09 g (186.4 mmol) and zinc acetylacetonate hydrate 10.5 g (37.28 mmol) and stirred and prepolymerized at 135° C. for 15 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 290° C. and 35 MPa for 3 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 6

1) The preparation of 2-allylphenyl glycidyl ether.

By mass, the solution A was obtained by 120 g of 2-allylphenol, 130 g of NaOH, 6 g of tetramethylammonium bromide and 280 g of tetrahydrofuran are maintained and stirred at 28° C. for 2 h; and then, 320 g of epichlorohydrin was slowly added into the solution A, which was maintained at 28° C. for 10 h. After the reaction, tetrahydrofuran and epichlorohydrin were removed in vacuum rotary evaporation propane to give the crude product. The crude product was washed with saturated $NH_4Cl$ solution (200 ml×2) and deionized water (200 mL×2) successively. Finally separated and purified using column chromatography to obtain a yellow viscous liquid which is 2-allylphenyl glycidyl ether (yield was 90.6%).

2) The preparation of bis(3-(2-allylphenoxy)-2-hydroxypropyl)adipate.

By mass, 120 g of 2-allylphenyl glycidyl ether, 42 g of adipic acid, 6 g of tetramethylammonium bromide and 280 g of acetonitrile were maintained and stirred at 68° C. for 10 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 85.7%).

3) The preparation of remoldable shape memory bismaleimide resin, N,N'-(1,4-phenylene) bismaleimide 50 g (186.4 mmol), bis(3-(2-allylphenoxy)-2-hydroxypropyl)adipate 109.88 g (208.08 mmol) and zinc acetylacetonate hydrate 11.76 g (41.76 mmol) and stirred and prepolymerized at 120° C. for 25 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 280° C. and 32 MPa for 4 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 7

1) The preparation of 2-allylphenyl glycidyl ether.

By mass, the solution A was obtained by 120 g of 2-allylphenol, 140 g of NaOH, 2 g of tetramethylammonium bromide, 6 g of tetrabutylammonium bromide and 280 g of tetrahydrofuran are maintained and stirred at 32° C. for 2 h; and then, 330 g of epichlorohydrin was slowly added into the solution A, which was maintained at 32° C. for 10 h. After the reaction, tetrahydrofuran and epichlorohydrin were removed in vacuum rotary evaporation propane to give the crude product. The crude product was washed with saturated $NH_4Cl$ solution (200 ml×2) and deionized water (200 mL×2) successively. Finally separated and purified using column chromatography to obtain a yellow viscous liquid which is 2-allylphenyl glycidyl ether (yield was 93.4%).

2) The preparation of bis(3-(2-allylphenoxy)-2-hydroxypropyl)adipate.

By mass, 120 g of 2-allylphenyl glycidyl ether, 39 g of adipic acid, 2 g of tetramethylammonium bromide, 6 g of tetrabutylammonium bromide and 280 g of acetonitrile were maintained and stirred at 72° C. for 12 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 86.8%).

3) The preparation of remoldable shape memory bismaleimide resin, N,N'-m-phenylene bismaleimide 50 g (186.4 mmol), bis(3-(2-allylphenoxy)-2-hydroxypropyl)adipate 84.36 g (160.3 mmol) and zinc acetylacetonate hydrate 9.03 g (32.06 mmol) and stirred and prepolymerized at 127° C. for 22 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 260° C. and 35 MPa for 6 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 8

1) The preparation of 2-allylphenyl glycidyl ether.

By mass, the solution A was obtained by 120 g of 2-allylphenol, 140 g of NaOH, 2 g of tetramethylammonium bromide, 7 g of tetrabutylammonium bromide and 260 g of tetrahydrofuran are maintained and stirred at 36° C. for 1.5 h; and then, 310 g of epichlorohydrin was slowly added into the solution A, which was maintained at 36° C. for 10 h. After the reaction, tetrahydrofuran and epichlorohydrin were removed in vacuum rotary evaporation propane to give the crude product. The crude product was washed with saturated $NH_4Cl$ solution (200 ml×2) and deionized water (200 mL×2) successively. Finally separated and purified using column chromatography to obtain a yellow viscous liquid which is 2-allylphenyl glycidyl ether (yield was 91.2%).

2) The preparation of bis(3-(2-allylphenoxy)-2-hydroxypropyl)adipate.

By mass, 120 g of 2-allylphenyl glycidyl ether, 38 g of adipic acid, 2 g of tetramethylammonium bromide, 7 g of tetrabutylammonium bromide and 260 g of acetonitrile were maintained and stirred at 74° C. for 10 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 85.7%).

3) The preparation of remoldable shape memory bismaleimide resin, N,N'-m-phenylene bismaleimide 50 g (186.4 mmol), bis(3-(2-allylphenoxy)-2-hydroxypropyl)adipate 98.09 g (186.4 mmol) and zinc acetylacetonate hydrate 10.5 g (37.28 mmol) and stirred and prepolymerized at 135° C. for 15 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 250° C. and 40 MPa for 8 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 9

1) The preparation of 2-allylphenyl glycidyl ether.

By mass, the solution A was obtained by 120 g of 2-allylphenol, 140 g of NaOH, 3 g of tetramethylammonium bromide, 5 g of tetrabutylammonium bromide and 200 g of tetrahydrofuran are maintained and stirred at 38° C. for 1 h; and then, 250 g of epichlorohydrin was slowly added into the solution A, which was maintained at 38° C. for 10 h. After the reaction, tetrahydrofuran and epichlorohydrin were removed in vacuum rotary evaporation propane to give the crude product. The crude product was washed with saturated $NH_4Cl$ solution (200 ml×2) and deionized water (200 mL×2) successively. Finally separated and purified using column chromatography to obtain a yellow viscous liquid which is 2-allylphenyl glycidyl ether (yield was 92.1%).

2) The preparation of bis(3-(2-allylphenoxy)-2-hydroxypropyl)adipate.

By mass, 120 g of 2-allylphenyl glycidyl ether, 40 g of adipic acid, 3 g of tetramethylammonium bromide, 5 g of tetrabutylammonium bromide and 200 g of acetonitrile were maintained and stirred at 75° C. for 12 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 86.3%).

3) The preparation of remoldable shape memory bismaleimide resin, N,N'-m-phenylene bismaleimide 50 g (186.4 mmol), bis(3-(2-allylphenoxy)-2-hydroxypropyl)adipate 109.88 g (208.08 mmol) and zinc acetylacetonate hydrate 11.76 g (41.76 mmol) were stirred and prepolymerized at 120° C. for 25 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 240° C. and 50 MPa for 10 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 10

1) The preparation of 2-allylphenyl glycidyl ether.

By mass, the solution A was obtained by 120 g of 2-allylphenol, 140 g of NaOH, 7 g of tetramethylammonium bromide, 3 g of tetrabutylammonium bromide and 270 g of tetrahydrofuran were maintained and stirred at 25° C. for 2 h; and then, 320 g of epichlorohydrin was slowly added into the solution A, which was maintained at 25° C. for 8 h. After the reaction, tetrahydrofuran and epichlorohydrin were removed in vacuum rotary evaporation propane to give the crude product. The crude product was washed with saturated $NH_4Cl$ solution (200 ml×2) and deionized water (200 mL×2) successively. Finally separated and purified using column chromatography to obtain a yellow viscous liquid which is 2-allylphenyl glycidyl ether (yield was 90.2%).

2) The preparation of bis(3-(2-allylphenoxy)-2-hydroxypropyl)adipate.

By mass, 120 g of 2-allylphenyl glycidyl ether, 43 g of adipic acid, 7 g of tetramethylammonium bromide, 2 g of tetrabutylammonium bromide and 290 g of acetonitrile were maintained and stirred at 78° C. for 8 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 84.9%).

3) The preparation of remoldable shape memory bismaleimide resin, N,N'-4,4'-diphenylmethane bismaleimide 25 g (69.75 mmol), N,N'-m-phenylene bismaleimide 25 g (93.2 mmol), bis(3-(2-allylphenoxy)-2-hydroxypropyl)adipate 73.75 g (140.14 mmol) and zinc acetylacetonate hydrate 7.89 g (28.02 mmol) and stirred and prepolymerized at 125° C. for 20 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 270° C. and 30 MPa for 5 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 11

1) The preparation of 2-allylphenyl glycidyl ether.

By mass, the solution A was obtained by 120 g of 2-allylphenol, 120 g of NaOH, 5 g of tetramethylammonium bromide, 5 g of tetrabutylammonium bromide and 250 g of tetrahydrofuran are maintained and stirred at 30° C. for 2 h; and then, 300 g of epichlorohydrin was slowly added into the solution A, which was maintained at 30° C. for 9 h. After the reaction, tetrahydrofuran and epichlorohydrin were removed in vacuum rotary evaporation propane to give the crude product. The crude product was washed with saturated $NH_4Cl$ solution (200 ml×2) and deionized water (200 mL×2) successively. Finally separated and purified using column chromatography to obtain a yellow viscous liquid which is 2-allylphenyl glycidyl ether (yield was 92.4%).

2) The preparation of bis(3-(2-allylphenoxy)-2-hydroxypropyl)adipate.

By mass, 120 g of 2-allylphenyl glycidyl ether, 41 g of adipic acid, 5 g of tetramethylammonium bromide, 5 g of tetrabutylammonium bromide and 260 g of acetonitrile were maintained and stirred at 75° C. for 9 h. After the reaction, acetonitrile was removed in vacuum rotary evaporation propane to give the crude product. The crude product was washed with saturated $NaHCO_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 85.3%).

3) The preparation of remoldable shape memory bismaleimide resin, N,N'-m-phenylene bismaleimide 25 g (93.2 mmol), N,N'-(1,4-phenylene) bismaleimide 25 g (93.2 mmol), bis(3-(2-allylphenoxy)-2-hydroxypropyl)adipate 98.09 g (186.4 mmol) and zinc acetylacetonate hydrate 10.5 g (37.28 mmol) and stirred and prepolymerized at 128° C. for 19 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 240° C. and 40 MPa for 7 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

Example 12

1) The preparation of 2-allylphenyl glycidyl ether.

By mass, the solution A was obtained by 120 g of 2-allylphenol, 130 g of NaOH, 7.5 g of tetrabutylammonium bromide and 250 g of tetrahydrofuran are maintained and stirred at 40° C. for 1.2 h; and then, 300 g of epichlorohydrin was slowly added into the solution A, which was maintained at 40° C. for 7.5 h. After the reaction, tetrahydrofuran and epichlorohydrin were removed in vacuum rotary evaporation propane to give the crude product. The crude product was washed with saturated NH$_4$Cl solution (200 ml×2) and deionized water (200 mL×2) successively. Finally separated and purified using column chromatography to obtain a yellow viscous liquid which is 2-allylphenyl glycidyl ether (yield was 92.7%).

2) The preparation of bis(3-(2-allylphenoxy)-2-hydroxypropyl)adipate.

By mass, 120 g of 2-allylphenyl glycidyl ether, 43 g of adipic acid, 8 g of tetrabutylammonium bromide and 250 g of acetonitrile were maintained and stirred at 80° C. for 9.5 h. After the reaction, acetonitrile was removed in vacuum rotary evaporation propane to give the crude product. The crude product was washed with saturated NaHCO$_3$ solution (200 ml×2) and deionized water (200 mL×2) successively. Finally separated and purified using column chromatography to obtain a yellow oil product which is bis(3-(2-allylphenoxy)-2-hydroxypropyl)adipate (yield was 85.9%).

3) The preparation of remoldable shape memory bismaleimide resin, N,N'-4,4'-diphenylmethane bismaleimide 25 g (69.75 mmol), N,N'-m-phenylene bismaleimide 12.5 g (46.6 mmol), N,N'-(1,4-phenylene) bismaleimide 12.5 g (46.6 mmol), bis(3-(2-allylphenoxy)-2-hydroxypropyl)adipate 96.04 g (162.95 mmol) and zinc acetylacetonate hydrate 10.28 g (36.5 mmol) and stirred and prepolymerized at 132° C. for 20 min to obtain a clear prepolymer; poured the clarified prepolymer into the preheated mold at 130° C., put it in a vacuum oven at 130° C. and vacuum for 45 minutes; moved the evacuated prepolymer into a blast drying oven, and solidify according to the following process post-treatment: 160° C./2 h+180° C./2 h+200° C./2 h+220° C./2 h and 240° C./4 h; after natural cooling, demolding, the remoldable shape memory bismaleimide resin can be obtained.

4) Remodeling method of remoldable shape memory bismaleimide resin and remodeled bismaleimide resin, pressing down the pulverized remoldable shape memory bismaleimide resin at 240° C. and 40 MPa for 6 h; After natural cooling released the mold to obtain the remoldable shape memory bismaleimide resin, which realized the remolding of the bismaleimide resin. The surface of the obtained remodeled resin block is smooth without cracks, indicating that the resin particles have undergone a dynamic transesterification reaction to reconnect the particles. This result fully proves that the bismaleimide resin can be reshaped by the present invention.

The invention claimed is:

1. A remoldable shape memory bismaleimide resin, wherein a preparation method of the remoldable shape memory bismaleimide resin comprises the following steps:
   (1) in the presence of a quaternary ammonium salt, reacting a 2-allylphenyl glycidyl ether with adipic acid to prepare bis(3-(2-allylphenoxy)-2-hydroxypropyl)adipate;
   (2) mixing bis(3-(2-allylphenoxy)-2-hydroxypropyl)adipate, bismaleimide, and a zinc compound to obtain a remoldable shape memory bismaleimide resin system;
   (3) curing and post-treating the remoldable shape memory bismaleimide resin system to prepare the remoldable shape memory bismaleimide resin.

2. The remoldable shape memory bismaleimide resin of claim 1, wherein the 2-allylphenyl glycidyl ether is prepared by adding epichlorohydrin to a mixture of 2-allylphenol, sodium hydroxide, the quaternary ammonium salt, and tetrahydrofuran.

3. The remoldable shape memory bismaleimide resin of claim 1, wherein, in the step (1), a mass ratio of the 2-allylphenyl glycidyl ether, adipic acid and the quaternary ammonium salt is 120:36-44:5-10, a reaction temperature is 65-80° C., and a reaction time is for 8-12 h; in the step (2), a mass ratio of bismaleimide, bis(3-(2-allylphenoxy)-2-hydroxypropyl)adipate and the zinc compound is 50:63.13-109.88:6.76-11.76, a stirring temperature is 120-135° C., and a reaction time is 15-25 min; in the step (3), the remoldable shape memory bismaleimide resin system is cured and post-treated by casting.

4. The remoldable shape memory bismaleimide resin of claim 1, wherein the quaternary ammonium salt is tetramethylammonium bromide or tetrabutylammonium bromide; the zinc compound is zinc acetylacetonate hydrate; the bismaleimide is one or more selected from the group consisting of N,N'-4,4'-diphenylmethane bismaleimide, N,N'-(1,4-phenylene) bismaleimide, and N,N'-m-phenylene bismaleimide.

5. The remoldable shape memory bismaleimide resin of claim 1, which is used in the preparation of remodelable materials or remodelable thermosetting resins.

6. A method for remolding a remodelable shape memory bismaleimide resin comprising the following steps:
   (1) in the presence of a quaternary ammonium salt, reacting a 2-allylphenyl glycidyl ether and adipic acid to prepare bis(3-(2-allylphenoxy)-2-hydroxypropyl)adipate;
   (2) mixing bis(3-(2-allylphenoxy)-2-hydroxypropyl)adipate, bismaleimide, and a zinc compound to obtain a remoldable shape memory bismaleimide resin system;
   (3) curing and post-treating the remodelable bismaleimide resin system to prepare a remoldable shape memory bismaleimide resin;
   (4) pulverizing and hot-pressing treating the remoldable shape memory bismaleimide resin to a remodeled remoldable shape memory bismaleimide resin, realizing the remodeling of the remoldable shape memory bismaleimide resin.

7. The method for remolding a remoldable shape memory bismaleimide resin of claim 6, wherein, in the step (1), a mass ratio of the 2-allylphenyl glycidyl ether, adipic acid and the quaternary ammonium salt is 120:36-44:5-10, a reaction temperature is 65-80° C., and a reaction time is for 8-12 h; in the step (2), a mass ratio of bismaleimide, bis(3-(2-allylphenoxy)-2-hydroxypropyl)adipate and the zinc compound is 50:63.13-109.88:6.76-11.76, a stirring temperature is 120-135° C., and a reaction time is 15-25 min; in the step (3), the remodelable bismaleimide resin system is cured and post-treated by casting; in the step (4), a temperature of the hot pressing treatment is 240-300° C., a pressure is 20-50 MPa, and a reaction time is 210 h.

8. The method for remolding a remoldable shape memory bismaleimide resin of claim 6, wherein the quaternary ammonium salt is tetramethylammonium bromide or tetrabutylammonium bromide; the zinc compound is zinc acetylacetonate hydrate; the bismaleimide is one or more selected from the group consisting of N,N'-4,4'-diphenylmethane bismaleimide, N,N'-(1,4-phenylene) bismaleimide and N,N'-m-phenylene bismaleimide.

9. A remodeled bismaleimide resin, wherein a method of preparing the remodeled bismaleimide resin comprising the following steps: pulverizing and hot-pressing treating a remoldable shape memory bismaleimide resin to obtain the remodeled bismaleimide resin; the remoldable shape memory bismaleimide resin is from claim 1.

10. The remodeled bismaleimide resin of claim 9, wherein a temperature of hot-pressing treatment is 240-300° C., a pressure is 20-50 MPa, and a reaction time is for 2-10 h.

\* \* \* \* \*